(12) United States Patent
Faye et al.

(10) Patent No.: US 6,473,712 B1
(45) Date of Patent: Oct. 29, 2002

(54) DEVICE FOR DETERMINING A ROADWAY GRADIENT QUANTITY

(75) Inventors: Ian Faye, Stuttgart; Klaus-Dieter Leimbach, Moeglingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/533,338

(22) Filed: Mar. 23, 2000

(30) Foreign Application Priority Data

Mar. 31, 1999 (DE) .......................................... 199 14 727

(51) Int. Cl.$^7$ .......................... G01L 15/00; G01L 19/02
(52) U.S. Cl. ........................ 702/138; 702/140; 701/94
(58) Field of Search .......................... 702/138, 50, 140; 701/94; 73/37, 375; 700/301; 280/5.506, 6.16

(56) References Cited

U.S. PATENT DOCUMENTS

| | | | |
|---|---|---|---|
| 3,046,793 A | 7/1962 | Riordan | 73/515 |
| 3,817,480 A * | 6/1974 | Ringwall | 244/78 |
| 4,135,304 A * | 1/1979 | Kuntz | 33/174 |
| 4,779,353 A | 10/1988 | Lopes et al. | 33/366 |
| 5,291,784 A | 3/1994 | Keyser | 73/516 |
| 5,428,902 A | 7/1995 | Cheah | 33/366 |
| 5,652,392 A * | 7/1997 | Lawson | 73/753 |
| 6,106,434 A * | 8/2000 | Ibamoto et al. | 477/120 |
| 6,157,894 A * | 12/2000 | Hess et al. | 702/54 |

FOREIGN PATENT DOCUMENTS

| | | |
|---|---|---|
| DE | 40 25 184 | 2/1992 |
| DE | 197 04 683 | 8/1998 |
| EP | 0 303 874 | 1/1989 |

\* cited by examiner

*Primary Examiner*—Hal Wachsman
*Assistant Examiner*—Paul L Kim
(74) *Attorney, Agent, or Firm*—Kenyon & Kenyon

(57) ABSTRACT

A device and method for determining a roadway gradient quantity, which describes the gradient of a roadway on which a vehicle is situated, is described. The device includes a liquid container, which is mounted to the vehicle and contains a liquid, at least one pressure sensor, which is mounted in the bottom of the liquid container and is used to ascertain a pressure quantity which describes the hydrostatic pressure in the liquid container, and an evaluation unit to which the pressure sensor is connected. In the evaluation unit, the roadway gradient quantity is determined as a function of the pressure quantity.

17 Claims, 2 Drawing Sheets

DEVICE FOR DETERMINING A ROADWAY GRADIENT QUANTITY

FIELD OF THE INVENTION

The present invention relates to a device and a method for determining a roadway gradient quantity.

BACKGROUND OF THE INVENTION

Conventional gradient sensors have different designs and different modes of operation. For example, U.S. Pat. Nos. 4,779,353, 5,428,902, and German Patent No. DE 40 25 184 describe gradient sensors having a sensor body which is filled with a measuring liquid whose liquid level aligns in response to an inclination. From the position of the liquid level, it is then possible to determine the inclination of a motor vehicle. The position of the liquid level is ascertained either on the basis of a change in resistance or a change in capacitance. Both the change in resistance and the change in capacitance are produced by the change in position of the liquid level of the measuring liquid and the associated different wetting of electrodes which are located in the sensor body.

Gradient sensors of the kind described above have the disadvantage of a complex design, resulting in their susceptibility to faults. This can lead to an increased risk of failure, therefore they are not possible for permanent use in a motor vehicle.

Other conventional sensors operate in accordance with the principle that an acceleration acting upon the sensor is converted into a change in pressure which is used as a measure for the acceleration acting upon the sensor. U.S. Pat. No. 3,046,793 describes an acceleration sensor having a cylindrical sensor body which is filled with a measuring liquid. The measuring liquid is used for damping the moving parts of the acceleration sensor and for converting an acceleration into a pressure. This pressure is measured and the acceleration is determined from the change in pressure. U.S. Pat. No. 5,291,784 describes an acceleration sensor having a cylindrical sensor body which is divided into two measuring chambers by a membrane. The measuring chambers are filled with a measuring liquid. An acceleration results in a pressure difference between the two measuring chambers. This pressure difference is measured, and the acceleration is determined therefrom.

The two aforementioned types of acceleration sensors are not suitable for determining the roadway gradient of a motor vehicle. They measure a pressure which develops because an acceleration acts upon the measuring liquid in the sensors. Since they contain moving parts, they are susceptible to faults.

Additionally, liquid level indicators which are used in vehicles. European Patent No. EP 0 303 874 describes a device for ascertaining the liquid quantity in a fuel tank which is mounted in a vehicle. The device includes three level sensors which are arranged in a predetermined position relative to each other. On the basis of the measured values of the three level sensors, a value for the filling amount of the tank, and a value for the inclination of the tank, and, consequently, also of the vehicle is calculated. When ascertaining the filling amount, the inclination of the tank is taken into account. Therefore, the ascertained filling amount is independent of either the inclination of the tank or of the vehicle.

German Patent No. DE 197 04 683 describes a device for measuring the inclination of a container relative to a liquid level inside the tank. In the case of a rigid installation of the container in the vehicle, it is possible to infer the vehicle inclination and the vehicle acceleration. According to an exemplary embodiment, three sensors are used for ascertaining the inclination of the container or of the vehicle. An inclination of the container results in different liquid levels; consequently, the sensors give out different voltages accordingly. On the basis of the different voltages and the known geometric arrangement of the liquid level sensors, a gradient signal is determined with the assistance of an evaluation circuit.

Using the two last-mentioned devices, it is possible to ascertain the inclination of the liquid container, and, consequently, also that of the vehicle. The gradient of the roadway on which the vehicle stands or moves, in the following also called roadway gradient or slope gradient, cannot be ascertained by any of the two aforementioned devices for the following reason: if one wishes to ascertain the roadway gradient on the basis of the inclination of the liquid container, then the motion of the vehicle must also be considered in doing so. The inclination of the vehicle is substantially composed of two components. One component originates from the gradient of the roadway. The other component results from the motion of the vehicle, as exists, for example, during acceleration or deceleration (pitching) or during a steering maneuver (rolling motion). Since, within the framework of determining the vehicle inclination when working with the two devices appertaining to the related art, no quantities are available which describe the aforementioned vehicle movement, the roadway gradient cannot be ascertained with the assistance of these devices, because the vehicle movement cannot be eliminated from the vehicle inclination.

Even if the two devices were modified to the effect that, by using them, it would be possible to ascertain the gradient of the roadway, they still have the disadvantage that they use liquid level indicators which contain moving parts, and therefore are susceptible to faults. Secondly, they require a non-negligible volume of liquid which is consequently lost from the tank capacity.

SUMMARY

An object of the present invention is to provide a device for determining a roadway gradient quantity which has a rugged design, and which is reliable, i.e., little susceptibility to faults. Moreover, the measuring arrangement used should not require a lot of mounting volume.

In the case of a liquid container rigidly joined to the vehicle, the inclination of the liquid container corresponds to the inclination of the vehicle, or to the inclination of the liquid contained in the liquid container.

The device according to the present invention for determining a roadway gradient quantity, which describes the gradient of a roadway on which a vehicle is situated, includes a liquid container which is mounted to the vehicle and contains a liquid. In one advantageous embodiment, this liquid container is a fuel tank.

With regard to a rugged and reliable design of the device, an advantageous embodiment is the use of pressure sensors as a measuring arrangement. In this embodiment, at least one pressure sensor is mounted in the area of the bottom of the liquid container. Using this pressure sensor, a pressure quantity is ascertained which describes the hydrostatic pressure in the liquid container. The pressure sensor is in communication with an evaluation unit. In the evaluation unit, the roadway gradient quantity is determined as a function of the pressure quantity.

The roadway gradient quantity describes the roadway gradient along and/or transverse to the vehicle's direction of travel.

In accordance with conventional physical principles, the evaluation unit determines the liquid level in the liquid container from the hydrostatic pressure and the inclination of the liquid container from the change in the liquid level, the inclination of the liquid container corresponding to the inclination of the vehicle. The roadway gradient quantity or slope gradient of the roadway surface is then determined from the inclination of the vehicle, taking into account vehicle movement. Herein the phrases "roadway gradient quantity" and "slope gradient of the roadway" are used interchangeably, and the phrases mean either a slope gradient of the roadway in the direction of travel of a vehicle or a slope gradient of the roadway transverse to the direction of travel of a vehicle or a combined vector of the slope gradient of the roadway both in the direction of travel and transverse to the direction of travel. The slope gradient is important information for recognizing the motor vehicle condition and for controlling specific motor vehicle functions. The slope gradient information is of significance, in particular in the detection of the mass of commercial vehicles, for coupling force control, and for vehicle dynamics control. Furthermore, it is possible to improve functions for engine timing (in gasoline and diesel engines), using the slope gradient information.

Using the device according to the present invention, it is possible to ascertain the roadway gradient in the direction of travel, or transverse to the direction of travel. The direction in which the roadway gradient can be determined depends on the number of pressure sensors and the positioning of the pressure sensors in the liquid container. As a general principle, the pressure sensors must not be mounted at a place on or in the liquid container where the liquid level does not change in response to changes in the roadway gradient.

The liquid level in the liquid container aligns according to the slope gradient, and the hydrostatic pressure at the pressure sensor changes with the slope gradient. This change is a measure for the instantaneous slope gradient of the entire vehicle. In this context, it is assumed that the gradient of the time rate of change of the liquid level resulting from the slope gradient is greater than the gradient of the time rate of change of the liquid level resulting from a current removal of liquid from the liquid container due to the operation of the motor vehicle. The gradients of the time rate of change of the liquid level are likewise calculated in the evaluation unit.

Suitable liquid containers include, for example, the container for the brake fluid, the container for the coolant, or the container for the windshield washer fluid. Important for selecting a suitable liquid container is that the specific liquid does not fill up the entire liquid container so that the liquid level can align relative to the liquid container in response to a sloped roadway surface. Ideally, the liquid container has a symmetrical cuboidal container geometry, and the liquid level should be able to align inside the liquid container in an unhindered manner, in accordance with the slope gradient. The mathematical relationships on the basis of which the roadway gradient is determined in the evaluation unit from the change in the liquid level are described in greater detail below for such a container geometry. For other container geometries, corresponding relationships to be individually determined can be ascertained (possibly also empirically). This applies also to liquid levels where the liquid level cannot freely align in accordance with the slope gradient.

In an advantageous embodiment, the liquid container is designed as a fuel tank. The fuel tank is usually the largest liquid container in a motor vehicle. Due to the size of the fuel tank, it is possible to arrange a plurality of pressure sensors at relatively great distances in relation to each other. When working with pressure sensors arranged at relatively great distances in relation to each other, the pressure differences measured in response to a vehicle inclination are greater than in the case of pressure sensors which are arranged close to each other. Because of the greater pressure differences, the accuracy of the device according to the present invention is increased.

In an advantageous embodiment of the present invention, the pressure sensors are incorporated in the bottom of the liquid container. In the case of a liquid container made of plastic, the pressure sensors can be directly cast and integrated with the plastic during the manufacture of the container. In this manner, efficient and inexpensive manufacturing of the device according to the present invention is possible. A further advantage of pressure sensors which are incorporated in the bottom of the liquid container is that the volume of the container is not reduced by the pressure sensors.

In an embodiment of the present invention, the accuracy and reliability of the device according to the present invention can be decisively improved by incorporating an arrangement for damping the sloshing motion of the liquid in the liquid container. This arrangement for damping the sloshing motion can be designed differently. In an advantageous embodiment, the arrangement for damping the sloshing motion is designed as a lining of porous material in the container or as platelike elements arranged inside the liquid container. These platelike elements can be designed, for example, as baffles. They can be arranged in the interior of the liquid container in nearly any way desired and, in particular, they can run parallel or orthogonally to each other.

According to the present invention, the hydrostatic pressure signal is evaluated as a function of the driving situation. The additional motion of the liquid in the liquid container during different driving situations can be analyzed beforehand either on the basis of road tests or by theoretical approaches. To take into account the driving situation in determining the roadway gradient quantity, at least one vehicle quantity which describes the vehicle motion and/or the vehicle condition is considered by the evaluation unit. To determine the vehicle quantity, the device according to the present invention makes provision for one or more detecting devices. These detecting devices include arrangements for detecting at least one of a value describing the vehicle's acceleration, a value describing the vehicle's steering angle, values describing the speeds of the individual wheels, a value describing the condition of the vehicle's brakes, and a value describing the condition of the engine. T he detecting arrangement for detecting a quantity describing the vehicle's acceleration detect the acceleration in the direction of travel (i.e., a longitudinal acceleration) or transversely to the direction of travel (i.e. a transverse acceleration due to cornering or skidding motion of the motor vehicle). The longitudinal acceleration may be determined, for example, with the aid of the engine torque (fuel injection), or on the basis of the wheel speeds, which are measured with the assistance of wheel speed sensors. The transverse acceleration can be measured, for example, with the assistance of a transverse acceleration sensor. When determining the slope gradient in the evaluation unit, the vehicle acceleration is then considered in such a manner that the inclination of the liquid in the liquid container is corrected by the inclination value resulting from the acceleration. It is also possible, however, to completely prevent the inclination of the vehicle from being measured during the acceleration phase.

Alternatively or in addition to the vehicle's acceleration, it is also possible to use the steering angle ascertained with the assistance of at least one of a steering angle sensor, the condition of the brakes, and the condition of the motor, to take into account the driving situation in determining the roadway gradient quantity in the evaluation unit. Information on the condition of the brakes can be provided, for example, by a brake slip control integrated in the vehicle. Accordingly, information on the condition of the motor can be provided by an ASR traction control system integrated in the vehicle.

The arrangement for ascertaining acceleration can also detect decelerations of the motor vehicle. The vehicle deceleration may also be taken account when determining the slope gradient. Alternatively, it is possible to evaluate brake pressure in order to measure vehicle deceleration.

If the roadway gradient is to be determined only in the direction of travel, the pressure sensor should ideally be mounted symmetrically to the width of the liquid container. For this purpose, the present invention proposes mounting a pressure sensor on the horizontal center line of the liquid container running in the direction of travel, at a distance from the vertical center line of the liquid container. This minimizes measuring influences transverse to the direction of travel due to the inclination of the vehicle, the slope gradient, or due to the vehicle's acceleration or deceleration.

If the roadway gradient is to be determined only transversely to the direction of travel, the pressure sensor should ideally be mounted symmetrically to the length of the liquid container. For this purpose, the present invention proposes mounting a pressure sensor on the horizontal center line of the liquid container running transversely to the direction of travel, at a distance from the vertical center line of the liquid container. This minimizes measuring influences in the direction of travel due to the inclination of the vehicle, the slope gradient, or due to the vehicle's acceleration or deceleration.

In the aforementioned embodiments where the present invention has only one pressure sensor, the pressure quantity values measured by the pressure sensor and present for successive time steps, are evaluated in the evaluation unit. For this purpose, two successive time steps are expediently examined. This procedure corresponds to a relative measurement, since, to determine the roadway gradient quantity, the time rate of change of the pressure quantity is required.

Also possible is an embodiment utilizing two pressure sensors, of which one pressure sensor determines slope gradients in the direction of travel and the other determines slope gradients transversely to the direction of travel. However, a device having two pressure sensors could also deliver absolute values for the inclination of the vehicle either in the direction of travel or transverse to the direction of travel.

An advantageous embodiment of the present invention proposes the mounting of two pressure sensors in the liquid container on the horizontal center line of the liquid container running in the direction of travel, at a distance from one another. Using such a sensor arrangement, it is possible to determine a slope gradient at any desired point of time. The pressure sensors are mounted symmetrically to the width of the liquid container. In this manner, inclinations can be determined only in the direction of travel. Measuring influences due to an inclination of the vehicle transverse to the direction of travel are reduced to a minimum. Instead of arranging the pressure sensors on the horizontal center line running transversely to the direction of travel, it would also be possible to arrange the sensors symmetrically to the width of the liquid container, but at different heights. Provided that the geometry of the sensor arrangement is known, it is also possible to determine the inclination of the motor vehicle using a sensor arrangement of differing heights just mentioned.

If the slope gradient is to be determined only transversely to the direction of travel, the pressure sensor should ideally be mounted symmetrically to the length of the liquid container. In an advantageous embodiment, the present invention mounts two pressure sensors in the liquid container on the horizontal center line of the liquid container running transversely to the direction of travel, at a distance from one another. In this manner, inclinations can be determined only transversely to the direction of travel. Thus, measuring influences due to an inclination of the vehicle in the direction of travel are reduced to a minimum. Instead of arranging the pressure sensors on the horizontal center line running transversely to the direction of travel, it would also be possible to arrange the sensors symmetrically to the length of the liquid container, but at different heights. Provided that the geometry of the sensor arrangement is known, it is also possible to determine the inclination of the motor vehicle using a sensor arrangement of that kind.

In these two embodiments described above, the values of the pressure quantities measured by the two pressure sensors are evaluated in the evaluation unit to determine the roadway gradient quantity. This procedure corresponds to an absolute measurement, since, to determine the roadway gradient quantity, the absolute pressure quantity values are required. In this case, the spatial change of the liquid level is evaluated.

In the above-described embodiments of the present invention having two pressure sensors, the angle of inclination of the liquid surface is independent of the geometry of the liquid container. Also possible is a device for determining the gradient of a roadway surface of a vehicle having four pressure sensors, of which one pair of pressure sensors determines slope gradients in the direction of travel and the other pair determines slope gradients transversely to the direction of travel.

To be able to determine the gradient of the roadway surface both in the direction of travel as well as transversely to the direction of travel, the inclination of the liquid surface relative to the liquid container is determined spatially, i.e., by three measuring points. Using three measuring points, it is possible to ascertain the position of a plane arbitrarily defined in the space. For this reason, the present invention proposes according to another advantageous embodiment to mount three pressure sensors in the liquid container at a distance from one another. Preferably, the pressure sensors are staggered.

Advantageously, the roadway gradient quantity is fed to at least one of an engine timing control, an automatic transmission control, a drive dynamics control, and a unit for detecting mass. To this end, an appropriate arrangement for transmitting the roadway gradient quantity to at least one of an engine timing control, an automatic transmission control, a vehicle dynamics control, or a unit for detecting mass are provided. In this manner, the engine timing, automatic transmission control, drive dynamics control, or the unit for detecting mass can be decisively improved by the additional information of the roadway gradient quantity.

The device according to the present invention can also be expediently used for ascertaining the liquid quantity in the liquid container. In containers without level monitoring, a display of the liquid quantity in the container becomes possible without additional technical effort. In containers which were already provided with an arrangement for level monitoring, this function can be assumed by the device according to the present invention.

A further object is to provide a method for determining a roadway gradient quantity which is executed in the device according to the present invention.

DETAILED DESCRIPTION

Figure 1:
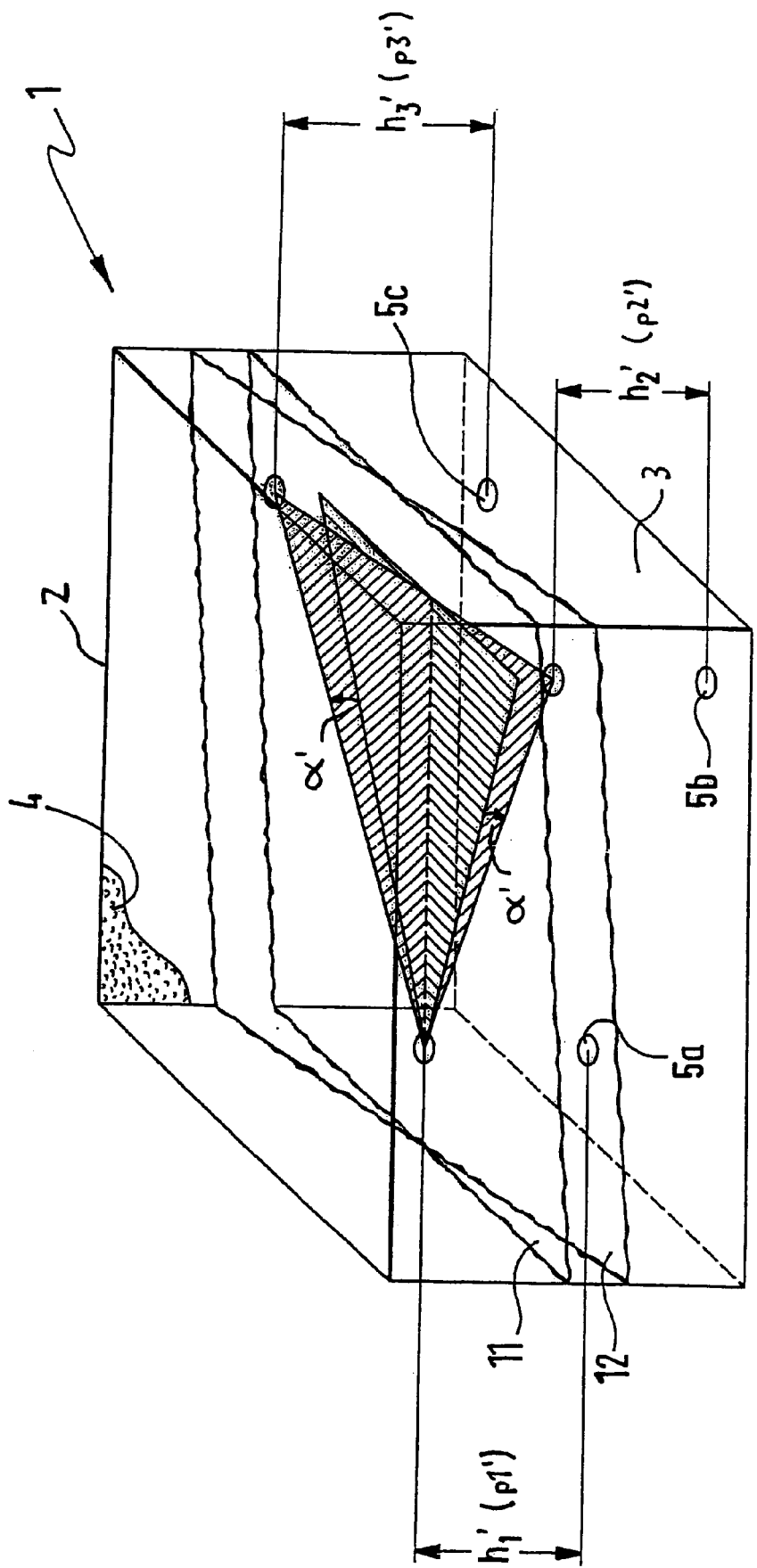
FIG. 1 shows a device according to the present invention in accordance with a first embodiment having three pressure sensors.

In FIG. 1, the device according to the present invention for determining the roadway gradient is referred to in its entirety with reference numeral 1. Device 1 has a liquid container 2 which is mounted to the motor vehicle. Liquid container 2, in this embodiment, is designed as a fuel tank of the vehicle. Liquid container 2 is filled with a liquid 3, namely fuel. To damp the sloshing motion of liquid 3 in liquid container 2, it is lined with porous material 4. In the area of the bottom of liquid container 2, three pressure sensors 5a, 5b, 5c are arranged at distances relative to each other. Pressure sensors 5a, 5b, 5c measure the hydrostatic pressure in liquid container 2, the hydrostatic pressure being converted into liquid levels in accordance with conventional physical principles.

In FIG. 1, the level of the liquid in liquid container 2 in the case of a level vehicle position is referred to with reference numeral 11. Height h1', h2', or h3' of the liquid level above the respective pressure sensor 5a, 5b, 5c is determined from the pressure values measured by pressure sensors 5a, 5b, 5c. Because of an inclination of the vehicle, the liquid level in liquid container 2 is changed accordingly. This change is a measure for the instantaneous inclination of the entire vehicle. In this context, it is assumed that the gradient of the time rate of change of the liquid level resulting from the slope gradient is greater than the gradient of the time rate of change of the liquid level resulting from a current removal of fuel. In FIG. 1, the level of the liquid in liquid container 2 in the case of an inclined vehicle is referred to with reference numeral 12.

To calculate the spatial position of the liquid level (pitch and roll angles) in the specific embodiment from FIG. 1, one measured value from each pressure sensor 5a, 5b, 5c, that is a total of 3 measured values, is used. Using these measured values it is possible to calculate the absolute value of the inclination of the motor vehicle in the longitudinal and transverse directions. Drawn in at pressure sensors 5a, 5b, 5c in FIG. 1 are also pressure quantities p1', p2', and p3' from which filling levels h1', h2', and h3' are each determined.

Figure 2:
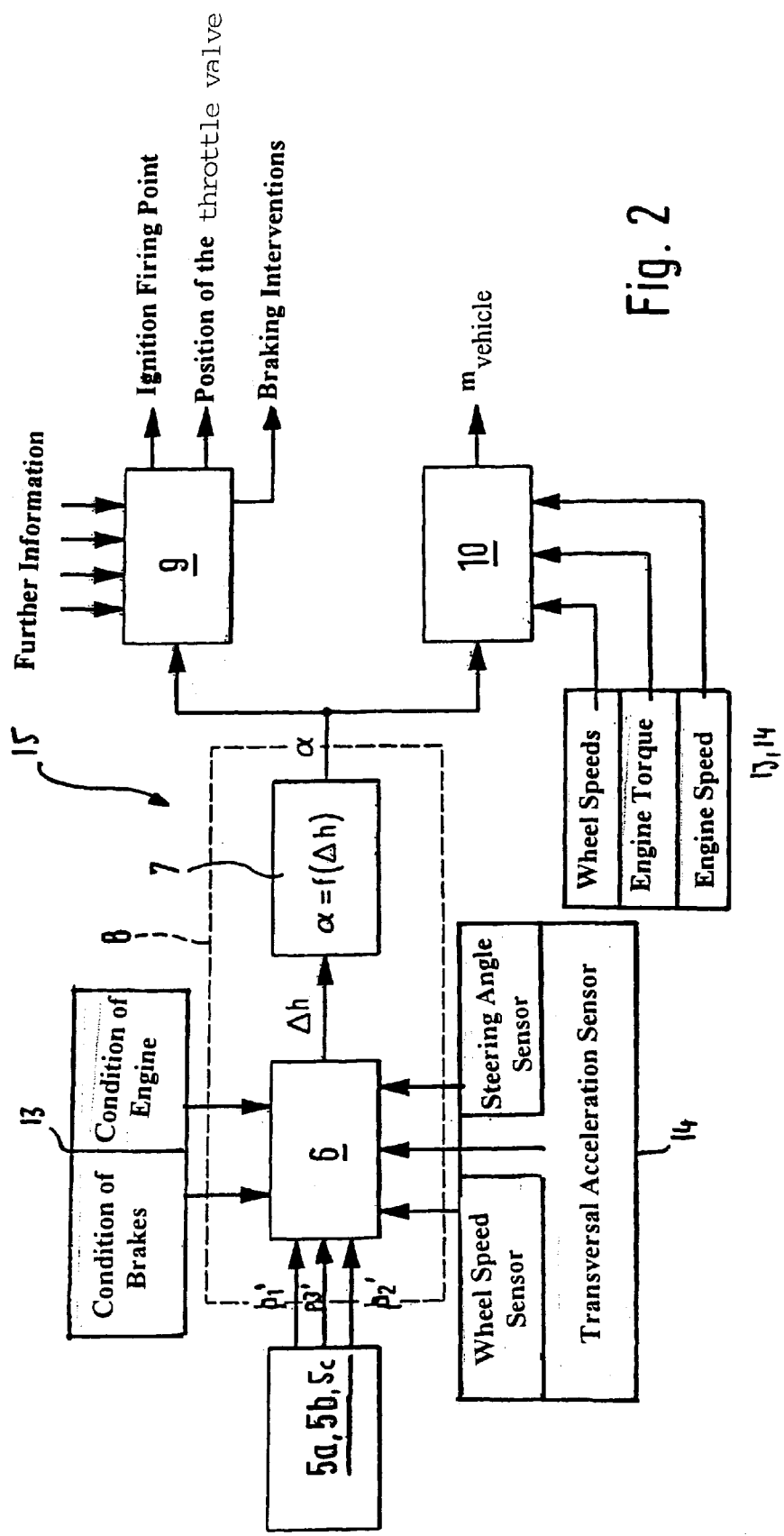
FIG. 2 shows a block diagram for determining the slope gradient with the assistance of the device according to the present invention in accordance with FIG. 1. This is not intended to constitute any restriction. The block diagram is applicable in corresponding manner also to devices having one pressure sensor or having two pressure sensors.

In FIG. 1, quantities h1', h2', and h3' show the level quantities where both the effect resulting from the roadway gradient and the effect resulting from the motion of the vehicle are taken into account. In FIG. 2 with the aid of evaluation means 6, the vehicle motion is eliminated from quantities h1', h2', and h3', and quantity $A\Delta h$ is made available which exhibits only the effect of the roadway gradient. The corresponding marking is also used for the roadway gradient quantity $\alpha$ and the inclination of the vehicle $\alpha'$. In equations (1) and (2) shown below, the quantities h1, h2, and h3 are used without the prime sign because they reflect the elimination of vehicle motion effects from h1', h2', h3' by evaluation means 6. The values h1, h2, h3, and $\alpha h$ are used for calculating the roadway gradient quantity $\alpha$. The above-described marking with a prime applies also for pressure quantities p1', p2', and p3' contained in FIG. 2.

In FIG. 2, a block diagram for determining roadway gradient quantity $\alpha$ either in the longitudinal or in the transverse directions is shown. This device is based on the arrangement shown in FIG. 1. This diagram is not intended to constitute any restriction on the device. The determination of roadway gradient quantity $\alpha$ can also be carried out with the aid of arrangements having one or two pressure sensors. In this context, reference is made to the two equations (1) and (2) specified below.

Pressure sensors 5a, 5b, 5c, via values p1', p2', and p3' of the pressure quantities, continuously furnish information on the liquid level or on the position of the liquid level in fuel tank 2. In the evaluation means, values p1', p2', and p3' of the pressure quantities are converted into filling levels h1', h2', and h3' with the assistance of conventional physical interrelationships. At the same time, an evaluation device 6 receives vehicle quantities which originate from detecting means 13 and 14 and describe the vehicle motion and/or the vehicle condition. Using the sensors for wheel speed, steering angle, or transverse acceleration, which are contained in detecting means 14, evaluation device 6 is supplied with vehicle motion quantities. Vehicle condition quantities, which are determined by means contained in detecting means 13, can also be fed to evaluation device 6. In particular, the vehicle condition quantities describe the condition of the brakes (e.g., control signals of the braking modulators or brake pressures) or of the engine (e.g., engine speed and engine torque). Consequently, acceleration phases, deceleration phases, and/or cornering can be determined and considered by evaluation device 6 during the determination of quantity $\Delta h$. Depending on the condition of the motor vehicle, a sloping position of the liquid level relative to fuel tank 2 will arise even without an existing slope gradient. Such angularities of the liquid level must be filtered out by evaluation device 6.

Evaluation device 6 then, as a function of the situation, outputs a corrected change in height $\Delta h$ which is subsequently processed in an evaluation device 7 to determine the roadway gradient quantity. Evaluation device 6 and evaluation device 7 are arranged in an evaluation unit 8.

The ascertained value for roadway gradient quantity $\alpha$ can then be fed to an engine timing control, an automatic transmission control, or a drive dynamics control 9, which in each case processes the roadway gradient quantity $\alpha$ together with further information acquired, for example, by detectors 13 or 14. An engine timing control determines, for example, the ignition firing point or position of the throttle valve. An automatic transmission control determines the selection of the gear transmission ratio. A drive dynamics control determines at least braking interventions, which are carried out individually for each wheel, to stabilize the vehicle about its vertical axis. The ascertained value for the roadway gradient quantity $\alpha$ can also be fed to a mass detection unit 10 which calculates the mass distribution of the vehicle from the value of the roadway gradient quantity together with the wheel speeds, the engine torque or the engine speed (these quantities are measured, for example, with the assistance of detectors 13 or 14). Because of the additional information on roadway gradient quantity α, it is possible to markedly simplify and improve the engine timing control, the automatic transmission control, or drive dynamics control 9, and the mass detection unit 10.

When using a pressure sensor, the mathematical interrelation between the change in height Δh and the roadway gradient quantity α is as follows:

$$\tan\alpha = \frac{2}{l-2l1}(h2-h1) = \frac{2}{l-2l1}\Delta h. \quad (1)$$

using length l of the liquid container, distance l1 of the pressure sensor from the edge of the liquid container, filling level h1 at instant t1, and filling level h2 at instant t2, where t2>t1.

When using two pressure sensors arranged on a center line of the liquid container running horizontally, the mathematical interrelation between the change in height Δh and the roadway gradient quantity α is as follows:

$$\tan\alpha = \frac{h2-h1}{l0} = \frac{\Delta h}{l0}. \quad (2)$$

using distance 10 between the first and the second pressure sensor, filling level h1 at the first pressure sensor, and filling level h2 at the second pressure sensor.

The above-described device according to the present invention for determining a roadway gradient quantity, in a slightly modified form, can also be used for determining inclination α' of the vehicle. In a motor vehicle, its inclination occurs as a result of a sloped roadway and the motion of the vehicle. The determination of the inclination of a means of locomotion is of interest, particularly also with regard to ships or aircraft.

To determine the inclination of the vehicle, the above-described device according to the present invention needs only to be altered in such a way that no elimination of the motion of the vehicle is carried out by evaluation device 6. To this end, this function can be suppressed in evaluation device 6, or evaluation device 6 as such is removed from evaluation unit 8. In other words: the values of the filling levels measured with the assistance of the pressure sensors are fed directly to evaluation device 7.

The device for determining a vehicle inclination quantity describing the inclination of a vehicle includes a liquid container which is mounted to the vehicle and contains a liquid. This liquid container is particularly a fuel tank. At least one pressure sensor is mounted in the area of the bottom of the liquid container. With the assistance of this pressure sensor, a pressure quantity is ascertained which describes the hydrostatic pressure in the liquid container. The pressure sensor is in communication with an evaluation unit. In this evaluation unit, the vehicle inclination quantity is determined as a function of the pressure quantity.

Finally, it should be mentioned that the type of the exemplary embodiment chosen in the description as well as the representation selected in the Figures are not intended to constitute any restrictive effect on the idea of the present invention.

What is claimed is:

1. A device for determining a roadway gradient quantity, the roadway gradient quantity describing at least one of the roadway gradient in the direction of travel of a vehicle and the roadway gradient transverse, the device comprising:
   a liquid container mounted to the vehicle and containing a liquid, the liquid container having a bottom;
   at least one pressure sensor mounted in an area of the bottom of the liquid container, the at least one pressure sensor ascertaining a pressure quantity describing a hydrostatic pressure in the liquid container; and
   an evaluation unit coupled to the at least one pressure sensor, the evaluation unit determining the roadway gradient quantity as a function of the pressure quantity.

2. The device according to claim 1, wherein the at least one pressure sensor is incorporated in the bottom of the liquid container.

3. The device according to claim 1, further comprising:
   a damping arrangement which reduces a sloshing motion of the liquid in the liquid container.

4. The device according to claim 3, wherein the damping arrangement includes at least one of: i) a porous material lining the liquid container, and ii) a plurality of platelike elements arranged inside the liquid container.

5. The device according to claim 1, further comprising:
   a detecting arrangement detecting at least one vehicle quantity used by the evaluation unit to determine the roadway gradient quantity.

6. The device according to claim 5, wherein the vehicle quantity describes at least one of: i) a vehicle acceleration value, ii) a vehicle steering angle value, iii) an individual wheel speed value, iv) a vehicle brake condition value, and v) an engine condition value.

7. The device according to claim 1, wherein the evaluation unit evaluates at least two successive time steps to determine the time rate of change of the pressure quantity ascertained by the at least one pressure sensor.

8. The device according to claim 1, wherein the at least one pressure sensor is mounted on at least one of: i) a horizontal center line of the liquid container running in the direction of travel, at a distance from a vertical center line of the liquid container, and ii) a horizontal center line of the liquid container running transversely to the direction of travel at a distance from the vertical center line of the liquid container.

9. The device according to claim 1, further comprising a plurality of pressure sensors mounted in the liquid container, wherein the plurality of pressure sensors ascertain pressure quantities, and wherein the plurality of pressure sensors includes at least a first pressure sensor and a second pressure sensor, and wherein the evaluation unit evaluates the pressure quantities ascertained by the plurality of pressure sensors to determine the roadway gradient quantity.

10. The device according to claim 9, wherein the two pressure sensors are arranged at least one of: i) at a distance from each other along a horizontal center line of the liquid container in the direction of travel, and ii) at a distance from each other along a horizontal center line of the liquid container transversely to the direction of travel.

11. The device according to claim 1, further comprising three pressure sensors mounted in the liquid container at a distance from each other, wherein the roadway gradient quantity describes both the roadway gradient in the direction of travel of a vehicle and the roadway gradient transverse to the direction of travel of a vehicle.

12. The device according to claim 1, wherein the roadway gradient quantity is sent to at least one of: i) an engine timing control, ii) an automatic transmission control, iii) a drive dynamics control, and iv) a unit for detecting mass.

13. The device according to claim 1, wherein the pressure quantity is converted into a filling level which is evaluated by the evaluation unit to determine the roadway gradient.

14. A method for determining a roadway gradient quantity, the roadway gradient quantity describing at least one of the roadway gradient in the direction of travel of a vehicle and the roadway gradient transverse to the direction of travel of a vehicle, comprising:

mounting a device on the vehicle, the device comprising:
a liquid container containing a liquid, the liquid container having a bottom,
at least one pressure sensor mounted in an area of the bottom of the liquid container, and
an evaluation unit coupled to the at least one pressure sensor;

ascertaining a pressure quantity describing a hydrostatic pressure in the liquid container, using the at least one pressure sensor;

evaluating the pressure quantity, using the evaluation unit; and determining the roadway gradient quantity as a function of the pressure quantity.

15. A method for determining a roadway gradient quantity, the roadway gradient quantity describing at least one of the roadway gradient in the direction of travel of a vehicle and the roadway gradient transverse to the direction of travel of a vehicle, comprising:

determining a pressure quantity describing a hydrostatic pressure in a liquid container, wherein the liquid container is mounted to the vehicle;

determining a quantity associated with the driving situation by detecting at least one of the driving situation values selected from the group consisting of acceleration of the vehicle, steering angle of the vehicle, speed of at least one wheel, braking condition of at least one brake, and condition of the engine; and determining the roadway gradient quantity as a function of the pressure quantity and the quantity associated with the driving situation.

16. The method according to claim 15, wherein the liquid container is a fuel tank; and further comprising the step of correcting for the effect on the absolute hydrostatic pressure in the fuel tank due to fuel consumption over time, by evaluating the time rate of change of the pressure quantity.

17. A device for determining a vehicle inclination quantity describing the inclination of a vehicle, the inclination of the vehicle occurring as a result of a sloped roadway, the device comprising:

a liquid container mounted to the vehicle and containing a liquid;

at least one pressure sensor, the at least one pressure sensor ascertaining a pressure quantity describing a hydrostatic pressure in the liquid container, wherein the at least one pressure sensor is mounted at the bottom of the liquid container at a position located on a first center line of the liquid container and at a distance from a second center line, wherein the first center line is a horizontal center line or a vertical center line, and wherein the second center line is the vertical center line or the horizontal center line that is orthogonal to the first center line; and an evaluation unit coupled to the at least one pressure sensor, the evaluation unit determining the vehicle inclination quantity as a function of the pressure quantity.

* * * * *

UNITED STATES PATENT AND TRADEMARK OFFICE
CERTIFICATE OF CORRECTION

PATENT NO.     : 6,473,712 B1  
DATED          : October 29, 2002  
INVENTOR(S)    : Faye et al.

It is certified that error appears in the above-identified patent and that said Letters Patent is hereby corrected as shown below:

Column 4,  
Line 52, delete "T"  
Line 53, change "he" to -- The --

Column 10,  
Line 2, change "transverse, the device" to -- transverse to the direction of travel of a vehicle, the device --

Signed and Sealed this

Seventeenth Day of February, 2004

JON W. DUDAS  
*Acting Director of the United States Patent and Trademark Office*